United States Patent
Cannon

(10) Patent No.: US 7,275,075 B2
(45) Date of Patent: *Sep. 25, 2007

(54) COPY PROCESS SUBSTITUTING COMPRESSIBLE BIT PATTERN FOR ANY UNQUALIFIED DATA OBJECTS

(75) Inventor: David Maxwell Cannon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/057,737

(22) Filed: Feb. 14, 2005

(65) Prior Publication Data

US 2005/0146945 A1 Jul. 7, 2005

Related U.S. Application Data

(63) Continuation of application No. 10/055,635, filed on Jan. 22, 2002, now Pat. No. 6,941,328.

(51) Int. Cl.
G06F 17/30 (2006.01)
(52) U.S. Cl. .................. 707/204; 707/205; 711/162
(58) Field of Classification Search ........ 707/200–205; 711/161–162
See application file for complete search history.

(56) References Cited

U.S. PATENT DOCUMENTS

| 5,193,171 A | 3/1993 | Shinmura et al. ........... 395/425 |
| 5,832,274 A | 11/1998 | Cutler et al. ................. 717/171 |
| 5,983,239 A | 11/1999 | Cannon ....................... 707/200 |
| 6,092,168 A * | 7/2000 | Voigt ........................... 711/170 |
| 6,098,074 A | 8/2000 | Cannon et al. .............. 707/200 |
| 6,112,211 A | 8/2000 | Bradshaw et al. ........... 707/205 |
| 6,148,412 A | 11/2000 | Cannon et al. ................ 714/6 |
| 6,247,171 B1 | 6/2001 | Yellin et al. ................. 717/126 |
| 6,446,176 B1 | 9/2002 | West et al. .................. 711/162 |
| 6,477,702 B1 | 11/2002 | Yellin et al. ................. 717/126 |
| 6,499,041 B1 | 12/2002 | Breslau et al. .............. 715/505 |
| 6,611,850 B1 * | 8/2003 | Shen ........................... 707/204 |
| 6,625,622 B1 | 9/2003 | Henrickson et al. ........ 707/204 |
| 6,721,742 B1 | 4/2004 | Uceda-Sosa et al. .......... 707/10 |

FOREIGN PATENT DOCUMENTS

JP S63-273949 11/1998

* cited by examiner

Primary Examiner—Debbie Le
(74) Attorney, Agent, or Firm—David W. Victor; Konrad Raynes & Victor LLP

(57) ABSTRACT

A copy procedure detects qualified data objects in a body of source data, and copies the source data to a target storage unit except for unqualified data objects, which are replaced with a prescribed bit pattern. Following completion of the backup, a record is prepared indicating that all data objects exist in the specified target storage, regardless of whether each data object was replaced with a predetermined bit pattern rather than being physically written to the specified target storage. This process may be repeated in order to perform data reclamation, effectively removing user files no longer qualifying for backup.

20 Claims, 9 Drawing Sheets

COPY PROCESS SUBSTITUTING COMPRESSIBLE BIT PATTERN FOR ANY UNQUALIFIED DATA OBJECTS

The present application is a continuation of U.S. patent application Ser. No. 10/055,635, filed Jan. 22, 2002 now U.S. Pat. No. 6,941,328.

BACKGROUND OF THE INVENTION

1. Field of the Invention

The present invention relates to digital data storage management. More particularly, the invention concerns a copy procedure that distinguishes between qualified and unqualified data objects in a body of source data, and copies the source data to a target storage unit except for unqualified user files, which are replaced with a prescribed compressible bit pattern. Regardless of whether data objects are copied or replaced with the prescribed bit pattern, the copy process reports them as having been copied successfully.

2. Description of the Related Art

The electronic management of data is central in this information era. Scientists and engineers have provided the necessary infrastructure for widespread public availability of an incredible volume of information. The Internet is one chief example. In addition, the high-technology industry is continually achieving faster and more diverse methods for transmitting and receiving data. Some examples include satellite communications and the ever-increasing baud rates of commercially available computer modems.

With this information explosion, it is increasingly important for users to have some means for storing and conveniently managing their data. In this respect, the development of electronic data storage systems is more important than ever. And, engineers have squarely met the persistent challenge of customer demand by providing speedier and more reliable storage systems.

As an example, engineers at INTERNATIONAL BUSINESS MACHINES CORPORATION (IBM) have developed various flexible systems called "storage management servers", designed to store and manage data for remotely located clients. One example is the TIVOLI STORAGE MANAGER (TSM) product. With this product, a central server is coupled to multiple client platforms and one or more administrators. The server provides storage, backup, retrieval, and other management functions for the server's clients.

Although the TSM product includes some significant improvements over prior storage systems, IBM continually seeks to improve the efficiency of this and other such systems. One area of possible focus is space utilization, namely, minimizing the amount of storage space required to store data. To minimize the cost of disk, tape, and other storage media, customers wish to minimize the storage space that their data occupies. Customers also seek to minimize other storage assets, such as tape library storage slots, etc. Although some useful approaches have been proposed to address these concerns, IBM is nevertheless seeking better solutions to benefit its customers.

SUMMARY OF THE INVENTION

Broadly, the present invention concerns a copy procedure that detects unqualified data objects in a body of source data, and copies the source data to a target storage unit except for unqualified data objects, which are replaced with a prescribed bit pattern. The invention detects and processes unqualified data objects whether they are "aggregated" or not. Aggregated data objects are data objects that have been concatenated for processing as a single unit to aid efficiency.

More specifically, a storage director initially reviews a body of source data to determine whether its data objects are already present in target storage. Data objects already present in target storage need not be copied. As for data objects not present in target storage, the storage director selectively copies the data objects to target storage. Then, the storage director applies prescribed criteria (such as differentiating between predetermined "active" and "inactive" data object designations) to determine which of the data objects qualify for copying, and which do not. Then, the storage director forms a "copy" of the source data on the target storage. In this copy operation, however, the storage director replaces each unqualified data object with a predetermined bit pattern. Responsive to completion of the copy operation, the storage director prepares a record indicating that the data object exists in target storage regardless of whether it was physically copied or replaced with the substitute bit pattern. The storage director may later repeat similar techniques to make a copy of the last copy, thereby performing a storage reclamation operation that consolidates storage to take advantage of any data objects that have become inactive after the first copy was made.

The foregoing features may be implemented in a number of different forms. For example, the invention may be implemented to provide a method of copying data. In another embodiment, the invention may be implemented to provide an apparatus such as a storage subsystem configured to copy data. In still another embodiment, the invention may be implemented to provide a signal-bearing medium tangibly embodying a program of machine-readable instructions executable by a digital data processing apparatus to copy data as discussed herein. Another embodiment concerns logic circuitry having multiple interconnected electrically conductive elements configured to copy data as disclosed herein.

The invention affords its users with a number of distinct advantages. For example, the copy technique disclosed herein may be used to implement a backup operation that essentially limits backup to "active" files, and omits "inactive" files from backup. Rather than being copied, the inactive files are replaced with a predetermined substitute bit pattern. Moreover, this entire process may be repeated to implement a reclamation process. By maintaining and using well organized metadata, active/inactive file status can be quickly determined with a minimum of processing overhead. Importantly, storage space can be conserved by using a substitute bit pattern that is highly compressible, for example, by hardware components that apply compression algorithms upon storage. Moreover, when substituting the prescribed bit pattern for any user files that are members of an aggregate file, the same length bit pattern is used so that the bit pattern (when uncompressed) occupies the same amount of storage as each respective substituted user file (when uncompressed). Consequently, offsets of each data object within an aggregate file are retained, preserving the accuracy of the original metadata. The invention also provides a number of other advantages and benefits, which should be apparent from the following description of the invention.

DETAILED DESCRIPTION

The nature, objects, and advantages of the invention will become more apparent to those skilled in the art after considering the following detailed description in connection with the accompanying drawings.

Hardware Components & Interconnections

Introduction

Figure 1A:
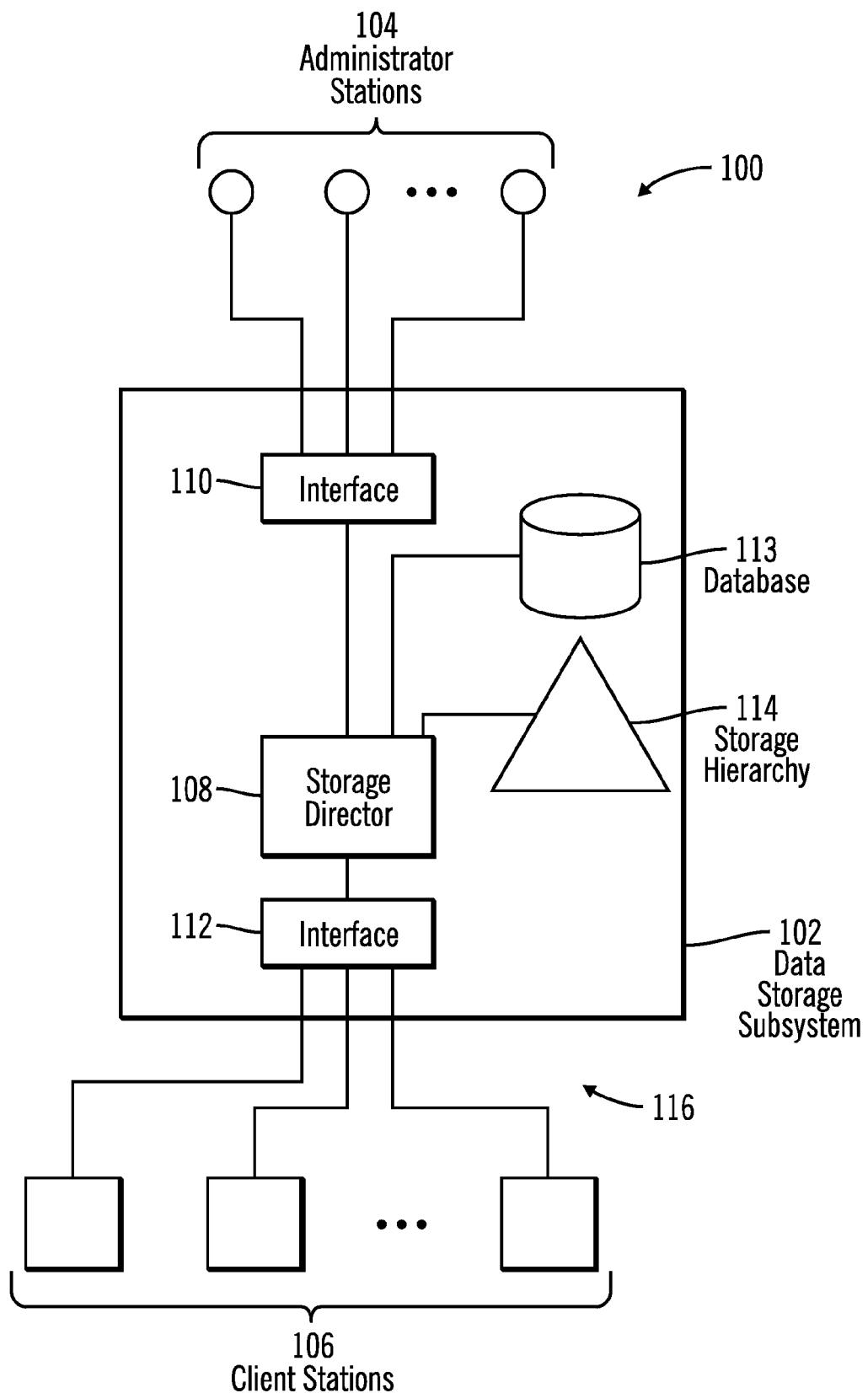
FIG. 1A is a block diagram of the hardware components and interconnections of a storage management system in accordance with the invention.

One aspect of the invention concerns a storage management system, which may be embodied by various hardware components and interconnections. One example is shown by the storage management system 100 of FIG. 1A. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files," also called "client files." In this regard, each client station 106 separately employs the subsystem 102 to archive, back up, retrieve, and restore its user files. Optionally, each user file may be associated with a single client station 106, which is the source of that user file.

Client Stations

Each client station 106 may comprise a general purpose computer such as a file server, workstation, personal computer, etc. The client stations 106 may comprise similar or different machines, running similar or different operating systems. Some exemplary operating systems include UNIX, OS/2, WINDOWS-NT, DOS, etc.

The client stations 106 are interconnected to the subsystem 102 by a network 116. The network 116 may comprise any desired connection, including one or more conductive wires or busses, fiber optic lines, data communication channels, wireless links, Internet, telephone lines, etc. In one example, a high speed communication channel such as a T3 link is may be used, employing a network protocol such as TCP/IP.

Administrator Stations

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application. The administrator stations 104 may be coupled to the subsystem 102 directly or by one or more suitable networks (not shown).

Data Storage Subsystem: Subcomponents

In an exemplary embodiment, the data storage subsystem 102 may comprise a commercially available server such as an IBM TSM product. However, since other hardware arrangements may be used as well, a generalized view of the subsystem 102 is discussed below.

The data storage subsystem 102 includes a storage director 108, having a construction as discussed in greater detail below. The storage director 108 exchanges signals with the network 116 and the client stations 106 via an interface 112, and likewise exchanges signals with the administrator stations 104 via an interface 110. The interfaces 110/112 may comprise any suitable device for communicating with the implemented embodiment of client station and administrator station. For example, the interfaces 110/112 may comprise ETHERNET cards, small computer system interfaces ("SCSIs"), parallel data ports, serial data ports, telephone modems, fiber optic links, wireless links, etc.

The storage director 108 is also coupled to a database 113 and a storage hierarchy 114. As discussed in greater detail below, the storage hierarchy 114 is used to store "managed files". A managed file may include an individual user file (stored as such), or multiple constituent user files stored together as a single "aggregate" file. Although the term "file" is used for illustration, numerous other data objects may be utilized in place of a file, such as a table space, image, database, binary bit pattern, etc.

The subsystem's storage of user files protects these files from loss or corruption on the client's machine, assists the clients by freeing storage space at the client stations, and also provides more sophisticated management of client data. In this respect, operations of the storage hierarchy 114 include "backing up" files from the client stations 106, backing up client stations' files contained in the storage hierarchy 114, "retrieving" stored files from the storage hierarchy 114 for the client stations 106, and "restoring" files backed-up on the hierarchy 114.

The database 113 contains information ("metadata") about the files contained in the storage hierarchy 114. This information, for example, includes the addresses at which files are stored, various characteristics of the stored data, certain client-specified data management preferences, etc. The contents of the database 113 are discussed in detail below.

More Detail: Exemplary Data Processing Apparatus

As mentioned above, the storage director 108 may be implemented in various forms. As one example, the storage director 108 may comprise a digital data processing apparatus, as exemplified by the hardware components and interconnections of the digital data processing apparatus 200 of FIG. 2.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. As one example, the fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

More Detail: Storage Hierarchy

Figure 4A:
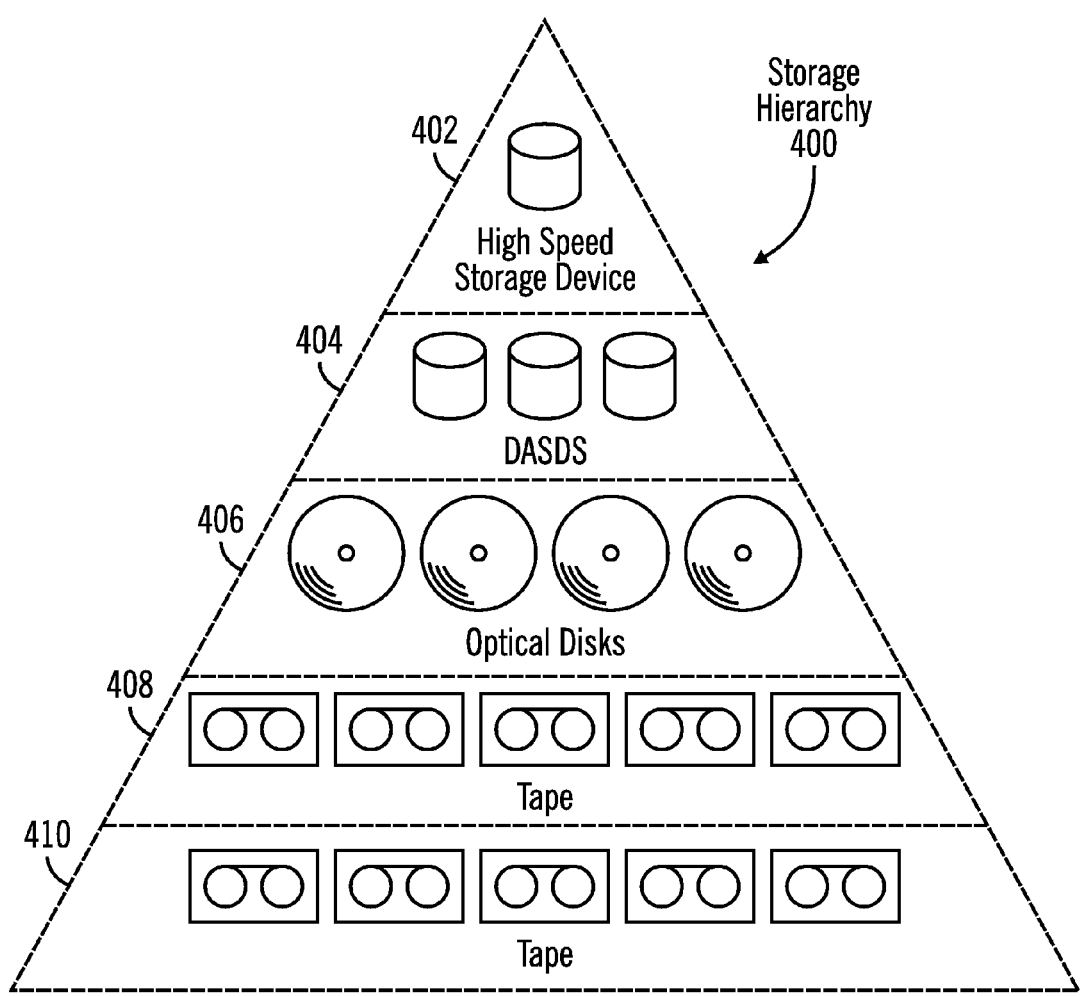
FIG. 4A is a block diagram showing the subcomponents of an illustrative storage hierarchy in accordance with the invention.

The storage hierarchy 114 may be implemented in storage media of various number and characteristics, depending upon the clients' particular requirements. To specifically illustrate one example, FIG. 4A depicts a representative storage hierarchy 400. The hierarchy 400 includes multiple levels 402-410, where levels nearer the top of the figure represent incrementally higher levels of storage performance. The levels 402-410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402-410, albeit the most expensive. The second level 404 includes DASDs with less desirable performance characteristics than the level 402, but with lower expense. The third level 406 includes multiple optical disks and one or more optical disk drives. The fourth and fifth levels 408-410 include even less expensive storage means, such as magnetic tape or another sequential-access storage device.

The levels 408-410 may be especially suitable for inexpensive, long-term data archival, whereas the levels 402-406 are appropriate for short-term, fast-access data storage. As an example, one or more devices in the level 402 and/or level 404 may even be implemented to provide a data storage cache.

Devices of the levels 402-410 may be co-located with the subsystem 102, remotely located, or a combination of both, depending upon the user's requirements. Accordingly, storage devices of the hierarchy 400 may be coupled to the storage director 108 by a variety of means, such as one or more conductive wires or busses, fiber optic lines, data communication channels, wireless links, Internet connections, telephone lines, SCSI connection, ESCON connection, etc.

Although not shown, the hierarchy 400 may be implemented with a single device type, and a corresponding single level. Ordinarily skilled artisans will recognize the "hierarchy" being used illustratively, since this disclosure contemplates but does not require a hierarchy of storage device performance.

More Detail: Storage & Copy Pools

Figure 4B:
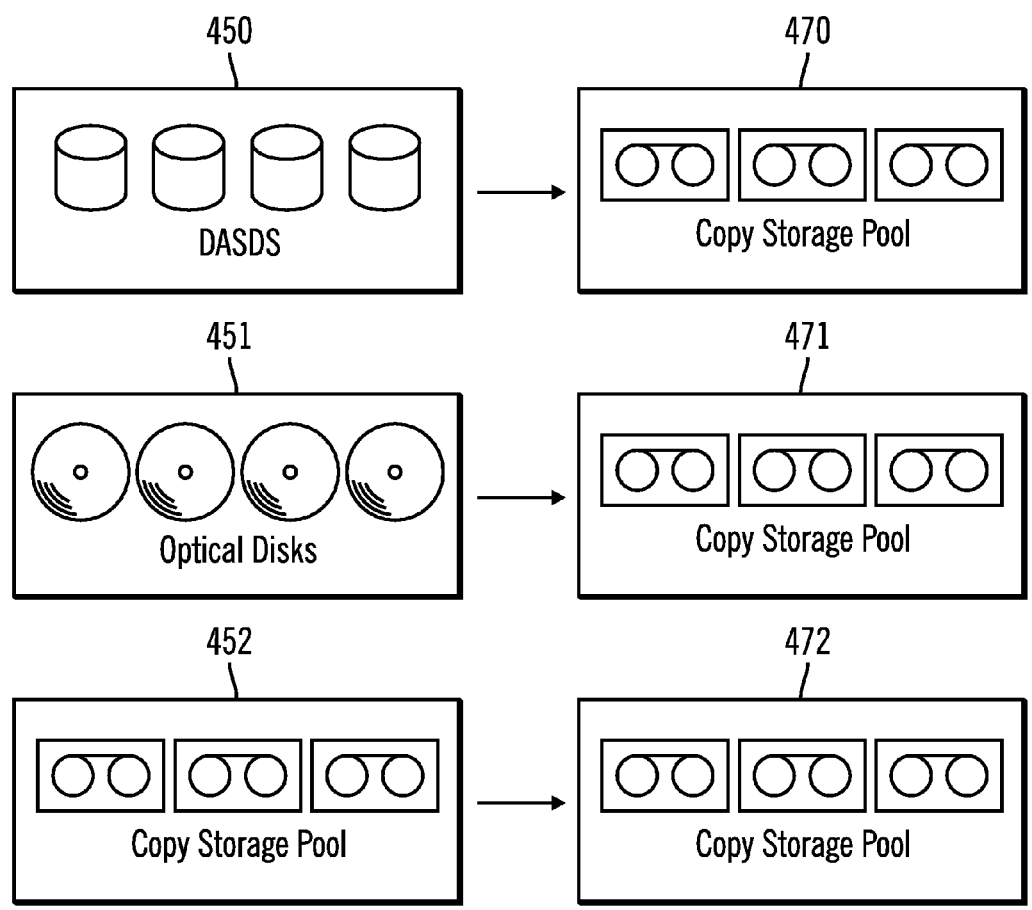
FIG. 4B is a block diagram showing some contents of the storage hierarchy of FIG. 4A in greater detail, and more particularly, the existence of primary storage pools and copy storage pools.

Optionally, the storage hierarchy 400 may utilize storage pools including primary storage pools and copy storage pools as shown by the example of FIG. 4B. Primary copies of user data are stored in primary storage pools such as 450-452 while backup copies of user data from the primary storage pools are copied to secondary storage pools 470-472, called "copy storage pools." In the illustrated embodiment, each storage pool represents a plurality of similar storage devices, such as DASDs 450, optical disks 451, magnetic tape devices 452, etc. In fact, all storage devices within a single storage pool may be identical in type and format. Additional information about storage pools and copy pools is disclosed in U.S. Pat. No. 6,148,412, which issued on Nov. 14, 2000 in the names of David Maxwell Cannon et al. The entirety of the foregoing patent is incorporated herein by reference.

Storage pools may be implemented in numerous ways, beyond that which is practicable and necessary for discussion herein, as such would be apparent to ordinarily skilled artisans having the benefit of this disclosure. For instance, the primary pools 450, 451, and 452 may all share the same copy pool. Additionally, data from one primary pool may be backed up to multiple copy pools.

More Detail: Database

As mentioned above, the database 113 is used to store various information about data contained in the storage hierarchy 114. This information, for example, includes the addresses at which data objects are stored in the storage hierarchy 114, various characteristics of the stored data, certain client-specified data management preferences, etc. Further explanation of the database 113 is provided below.

File Aggregation

The subsystem 102 manages various data objects, which are embodied by "managed files" for purposes of this illustration. Each managed file comprises one user file or an aggregation of multiple constituent user files. The use of aggregate files is optional, however, and all managed files may constitute individual user files if desired. The "user" files are created by the client stations 106, and managed by the subsystem 102 as a service to the client stations 106. The subsystem 102's use of aggregate files, however, is transparent to the client stations 106, which simply regard user files individually. This "internal" management scheme helps to significantly reduce file management overhead costs by using managed files constructed as aggregations of many different user files. In particular, the subsystem 102 treats each managed file (whether aggregate or not) as a single file during backup, move, and other subsystem operations, reducing the file management overhead to that of a single file.

Figure 5:
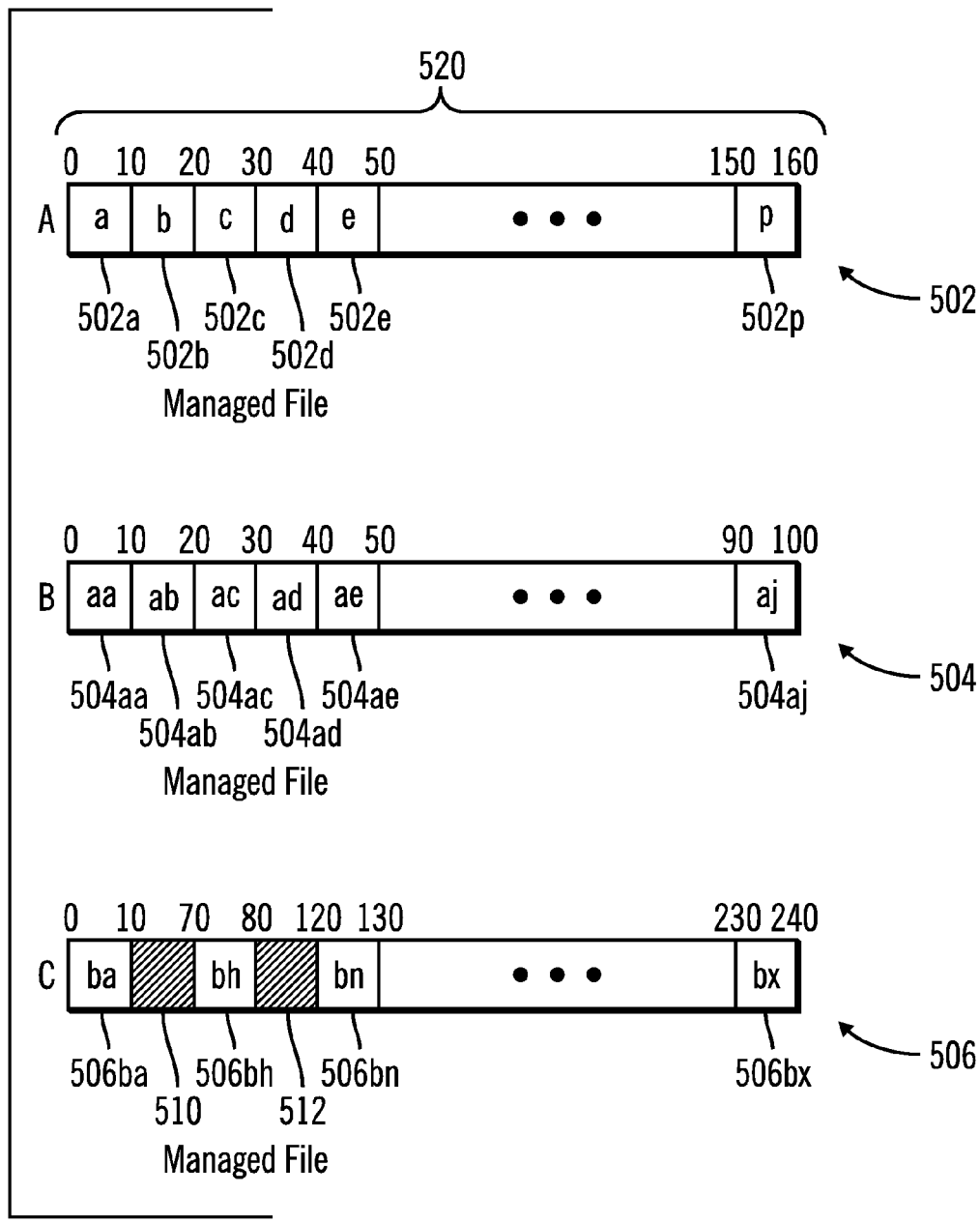
FIG. 5 is a block diagram showing the interrelationship of various user files and aggregate files.

FIG. 5 shows an exemplary set of managed files 502-506. For ease of explanation, uppercase alphabetic designators refer to aggregate files, whereas lowercase designators point out individual user files. Thus, the managed files 502-506 are also referenced by corresponding alphabetic designators A-C, for simpler representation in various tables shown below.

The managed file 502 includes multiple user files 502a-502p (also identified by alphabetic designators a-p). The user files 502a-502p are stored adjacent to each other to conserve storage space. The position of each user file in the managed file 502 is denoted by a corresponding one of the "offsets" 520. In an exemplary implementation, the offsets may represent bytes of data. Thus, the first user file 502a has an offset of zero bytes, and the second user file 502b has an offset of ten bytes. In the simplified example of FIG. 5, each user file is ten bytes long.

FIG. 5 also depicts other managed files 504, 506, each including various user files. In this example, the managed file 506 contains unused areas 510/512 that were once occupied by user files but later deleted. As shown in FIG. 5, the files 506ba, 506bh . . . 506bn. 506bx are present in the managed file 506. Additional details of file aggregation are disclosed in U.S. Pat. No. 6,098,074, which issued on Aug. 1, 2000 in the names of Cannon et al. The entirety of the foregoing patent is incorporated herein by reference.

Tables

Figure 1B:
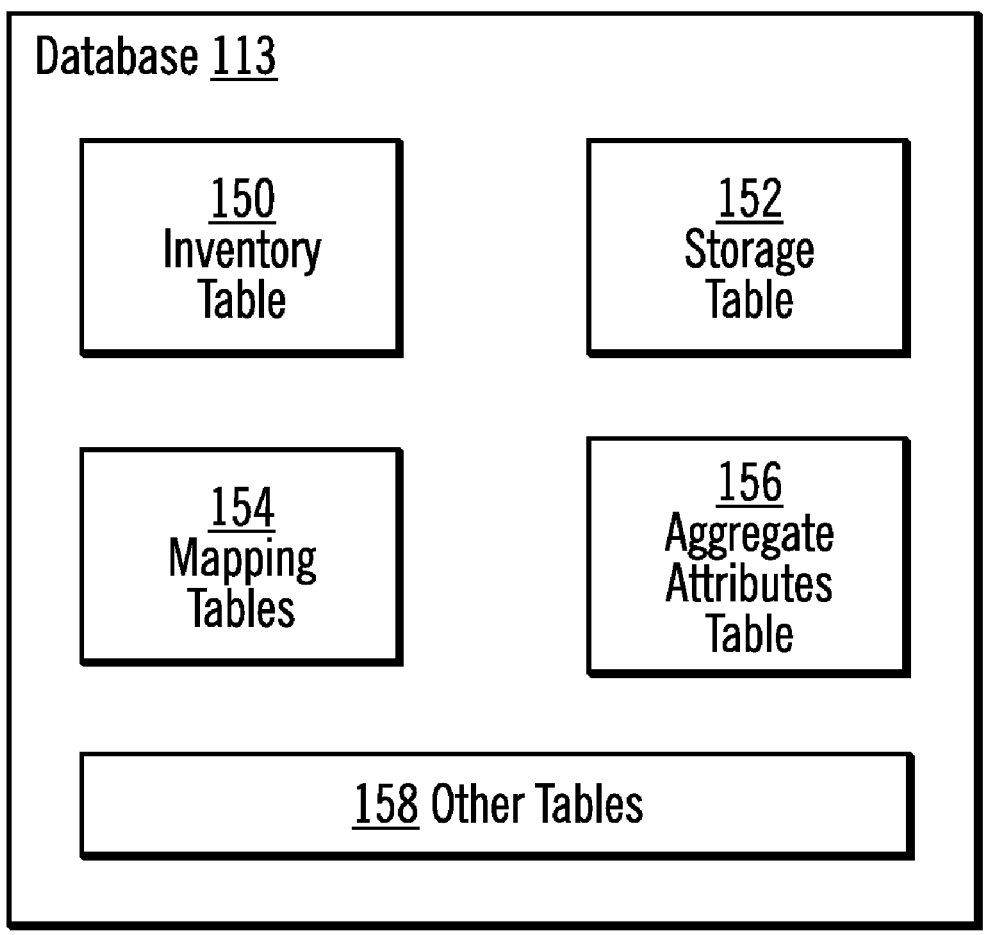
FIG. 1B is a block diagram showing the database component of FIG. 1A in greater detail.

The database 113 is composed of various information including tables that store information about data contained in the storage hierarchy 114. FIG. 1B shows the contents of the database 113 in greater detail. Namely, these tables include an inventory table 150, a storage table 152, mapping tables 154, and an aggregate attributes table 156. Other tables 158 may be utilized, as well, depending upon the nature of the intended application. Each table provides a different type of information, exemplified in the description below. Ordinarily skilled artisans (having the benefit of this disclosure) will quickly recognize that the tables shown below are merely examples, that this data may be integrated, consolidated, or otherwise reconfigured, and that their structure and contents may be significantly changed, all without departing from the scope of the present invention. Moreover, instead of tables, this data may be organized as one or more object-oriented databases, relational databases, linked lists, etc.

Inventory Table

TABLE 1, below, shows an example of the inventory table 150. The inventory table contains information specific to each user file stored in the subsystem 102, regardless of the location and manner of storing the user files. Generally, the inventory table cross-references each user file with various "client" information and various "policy" information. More particularly, each user file is listed by its filename, which may comprise any alphabetic, alphanumeric, numeric, or other code uniquely associated with that user file. The inventory table contains one row for each user file.

The client information includes information relative to the client station 106 with which the user file is associated. In the illustrated example, the client information is represented by "client number", and "source" columns. For each user file, the "client number" column identifies the originating client station 106. This identification may include a numeric, alphabetic, alphanumeric, or other code. In this example, a numeric code is shown. The "source" column lists a location in the client station 106 where the user file is stored locally by the client. As a specific example, a user file's source may comprise a directory in the client station.

In contrast to the client information of TABLE 1, the policy information includes information concerning the client's preferences for data management by the subsystem 102. Optimally, this information includes the client's preferences themselves, as well as information needed to implement these preferences. In the illustrated example, the policy information is represented by the "retention time" and "active?" columns. Under the column heading "active?" the table 150 indicates whether each user file is considered "active" or "inactive." In one embodiment, this is manually specified by an operator, host, application, or other source. Alternatively, the active/inactive determination may be made automatically, by appropriate criteria. One such criterion for being "inactive" includes files that have been stored in the storage hierarchy 114 while their counterpart at a client station 106 is later modified or deleted. Other examples of criteria for active/inactive status include the frequency or recency of use of a file, the file's source location, the length of time since the file has been referenced by a client station, etc. In still another embodiment, the "active?" column may be omitted, with the active/inactive determination being made "on the fly" whenever the active/inactive status of a file affects any action to be taken. The policy information may also include other columns (not shown), for example, listing a maximum number of backup versions to maintain, time stamps of backed-up data, etc.

TABLE 1

INVENTORY TABLE

| FILENAME | ACTIVE? | CLIENT NUMBER | SOURCE | RETENTION TIME (APPLICABLE TO INACTIVE FILES) |
|---|---|---|---|---|
| a | no | 1 | /usr | 30 DAYS |
| b | yes | 1 | /usr | 30 DAYS |
| c | no | 1 | /usr | 30 DAYS |
| d | yes | 1 | /usr | 30 DAYS |
| e | no | 1 | /usr | 30 DAYS |
| . . . | . . . | 1 | /usr | 30 DAYS |
| p | yes | 1 | /usr | 30 DAYS |
| aa | yes | 27 | D:\DATA | 90 DAYS |
| ab | yes | 27 | D:\DATA | 90 DAYS |
| ac | yes | 27 | D:\DATA | 90 DAYS |
| ad | no | 27 | D:\DATA | 90 DAYS |
| ae | yes | 27 | D:\DATA | 90 DAYS |
| . . . | . . . | 27 | D:\DATA | 90 DAYS |
| aj | yes | 27 | D:\DATA | 90 DAYS |
| ba | yes | 3 | C:\DATA | 365 DAYS |
| bh | no | 3 | C:\DATA | 365 DAYS |
| bn | no | 3 | C:\DATA | 365 DAYS |
| . . . | . . . | 3 | C:\DATA | 365 DAYS |
| bx | yes | 3 | C:\DATA | 365 DAYS |

Storage Table

TABLE 2, below, shows an example of the storage table 152. In contrast to the inventory table 150 (described above), the storage table 152 contains information about where each managed file is stored in the storage hierarchy 114. The storage table 152 contains a single row for each storage instance of a managed file.

In the illustrated example, the storage table 152 includes "managed filename", "storage pool", "volume", "location", "file(s) containing substitute pattern," and any other desired columns. The "managed filename" column lists all managed files by filename. Each managed file has a filename that comprises a unique alphabetic, alphanumeric, numeric, or other code. For each managed file, the "storage pool" identifies a subset of the storage hierarchy 114 where the managed file resides, and more particularly, one of the primary or copy storage pools. As mentioned above, each "storage pool" is a group of storage devices of the storage hierarchy 114 having similar performance characteristics. Identification of each storage pool may be made by numeric, alphabetic, alphanumeric, or another unique code. In the illustrated example, numeric codes are used.

The "volume" column identifies a sub-part of the identified storage pool. In the data storage arts, data is commonly grouped, stored, and managed in logical "volumes", where a volume may comprise a tape or a portion of a DASD. The "location" column identifies the corresponding managed file's location within the volume. As an example, this value may comprise a track/sector combination (for DASDs or optical disks), a tachometer reading (for magnetic tape), address, etc.

The "file(s) containing substitute bit pattern" column identifies any constituent user files of the listed managed file that have been replaced by a predetermined bit pattern rather than being physically stored. Alternatively, instead of using this column, the invention may make a nonspecific notation (1) for each managed file that is a user file that contains the substitute bit pattern, and (2) for each managed file that is an aggregate file having one or more constituent user files that have been replaced with the substitute bit pattern. In still another embodiment, the "file(s) containing substitute bit pattern" column may be omitted entirely, as explained in greater detail below.

TABLE 2

STORAGE TABLE

| MANAGED FILENAME | STORAGE POOL | VOLUME | LOCATION | FILE(S) CONTAINING SUBSTITUTE BIT PATTERN |
|---|---|---|---|---|
| A | 1 (PRIMARY) | 39 | 1965 | |
| A | 7 (COPY) | 17 | 2378 | a, c |
| A | 8 (COPY) | 9 | 1123 | a |
| B | 1 (PRIMARY) | 39 | 4967 | |
| B | 7 (COPY) | 17 | 5492 | ad |
| C | 1 (PRIMARY) | 2 | 16495 | |
| C | 7 (COPY) | 21 | 439 | bn |

Mapping Tables

TABLES 3A-3B, below, provide an example of the mapping tables 154. Generally, these tables operate to bidirectionally cross-reference between aggregate files and user files. The mapping tables identify, for each aggregate file, all constituent user files. Conversely, for each user file, the mapping tables identify one or more aggregate files containing that user file. In this respect, the specific implementation of TABLES 3A-3B includes an "aggregate->user" table (TABLE 3A) and a "user->aggregate" table (TABLE 3B).

The "aggregate->user" table contains multiple rows for each aggregate file, each row identifying one constituent user file of that aggregate file. Each row identifies a aggregate/userfile pair by the managed filename ("managed filename" column) and the user filename ("user filename").

Conversely, each row of the "user->aggregate" table lists a single user file by its name ("user filename" column), cross-referencing this user file to one managed file containing the user file ("managed filename"). If the user file is present in additional managed files, the mapping tables contain another row for each additional such managed file. In each row, identifying one user/managed file pair, the row's user file is also cross-referenced to the user file's length ("length" column) and its offset within the aggregate file of that pair ("offset" column). In this example, the length and offset are given in bytes.

| TABLE 3A AGGREGATE -> USER | | TABLE 3B USER -> AGGREGATE | | | |
|---|---|---|---|---|---|
| MANAGED (AGGREGATE) FILENAME | USER FILENAME | USER FILENAME | MANAGED (AGGREGATE) FILENAME | LENGTH | OFFSET |
| A | a | a | A | 10 | 0 |
| | b | b | A | 10 | 10 |
| | c | c | A | 10 | 20 |
| | d | d | A | 10 | 30 |
| | e | e | A | 10 | 40 |
| | ... | ... | A | 10 | ... |
| | p | p | A | 10 | 150 |
| B | aa | aa | B | 10 | 0 |
| | ab | ab | B | 10 | 10 |
| | ac | ac | B | 10 | 20 |
| | ad | ad | B | 10 | 30 |
| | ae | ae | B | 10 | 40 |
| | ... | ... | B | ... | ... |
| | aj | aj | B | 10 | 90 |
| C | ba | ba | C | 10 | 0 |
| | bh | bh | C | 10 | 70 |
| | bn | bn | C | 10 | 120 |
| | ... | ... | C | ... | ... |
| | bx | bx | C | 10 | 230 |

Aggregate Attributes Table

TABLE 4, below, shows an example of the aggregate attributes table 156. This table accounts for the fact that, after time, an aggregate file may contain some empty space due to deletion of one or more constituent user files. As explained below, the subsystem 102 generally does not immediately consolidate an aggregate file upon deletion of one or more constituent user files. This contributes to the efficient operation of the subsystem 102, by minimizing management overhead for the aggregate files.

If desired, to conserve storage space, reclamation may be performed to remove unused space between and within aggregate files, as taught by U.S. Pat. No. 6,021,415, which issued on Feb. 1, 2000. The reclamation procedure, as discussed in the '415 patent, utilizes knowledge of aggregate file attributes as maintained in the aggregate attributes table.

Each row of the aggregate attributes table represents a different managed file, identified by its managed filename ("managed filename" column). Each row lists one aggregate file, along with its original size upon creation ("original size"), present size not including deleted user files ("in-use size"), and number of non-deleted user files ("in-use files").

TABLE 4

AGGREGATE ATTRIBUTES TABLE

| MANAGED FILENAME | ORIGINAL SIZE | IN-USE SIZE | IN-USE FILES |
|---|---|---|---|
| A | 160 | 160 | 16 |
| B | 100 | 100 | 10 |
| C | 240 | 130 | 13 |

Other Tables

The database 113 may also be implemented to include a number of other tables 158 if desired, the content and structure being apparent to those of ordinary skill in the art (having the benefit of this disclosure). Some or all of these tables, for instance, may be added or incorporated into various existing tables discussed above. In one embodiment, the database 113 includes a storage pool table (not shown)

indicating whether each storage pool is a primary or copy storage pool, rather than including this information in the "storage pool" column of the storage table 152.

OPERATION

Having described various structural features, an operational aspect of the present invention will now be described.

Signal-Bearing Media

Figure 2:
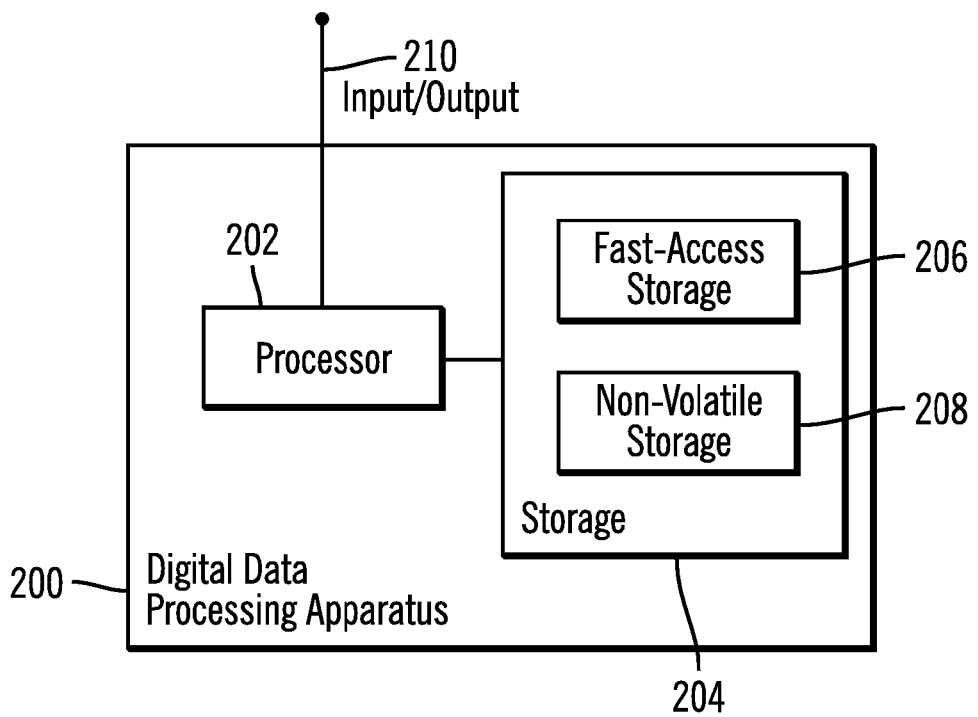
FIG. 2 is a block diagram of a digital data processing machine in accordance with the invention.
Figure 3:
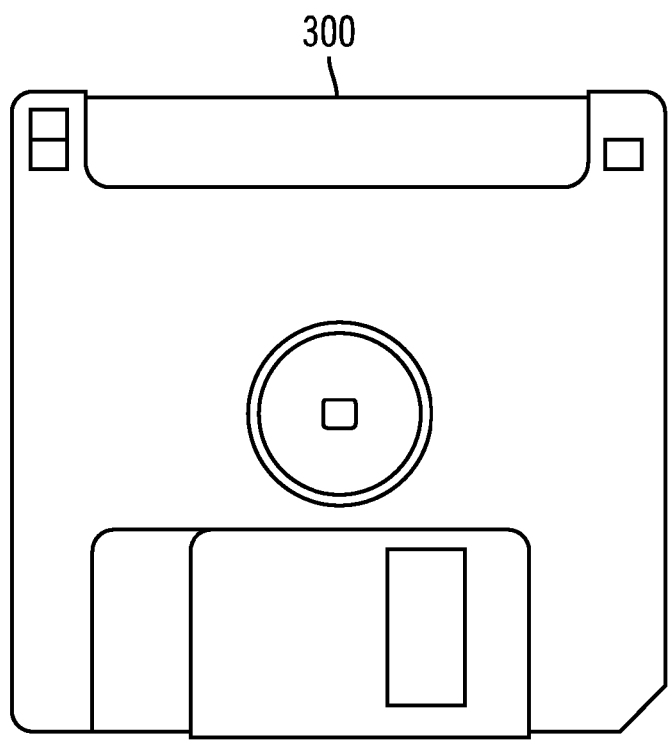
FIG. 3 shows an exemplary signal-bearing medium in accordance with the invention.

Wherever the functionality of the invention is implemented using machine-executed program sequences, these sequences may be embodied in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another DASD), sequential-access storage such as magnetic tape, electronic non-volatile memory (e.g., ROM, EPROM, or EEPROM), battery backup RAM, optical storage (e.g., CD-ROM, WORM, DVD), or other suitable signal-bearing media including analog or digital transmission media and communication links and wireless communications. In an illustrative embodiment of the invention, the machine-readable instructions may comprise software object code, assembled from assembly language, compiled from a language such as C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Backup Sequence

Figure 6:
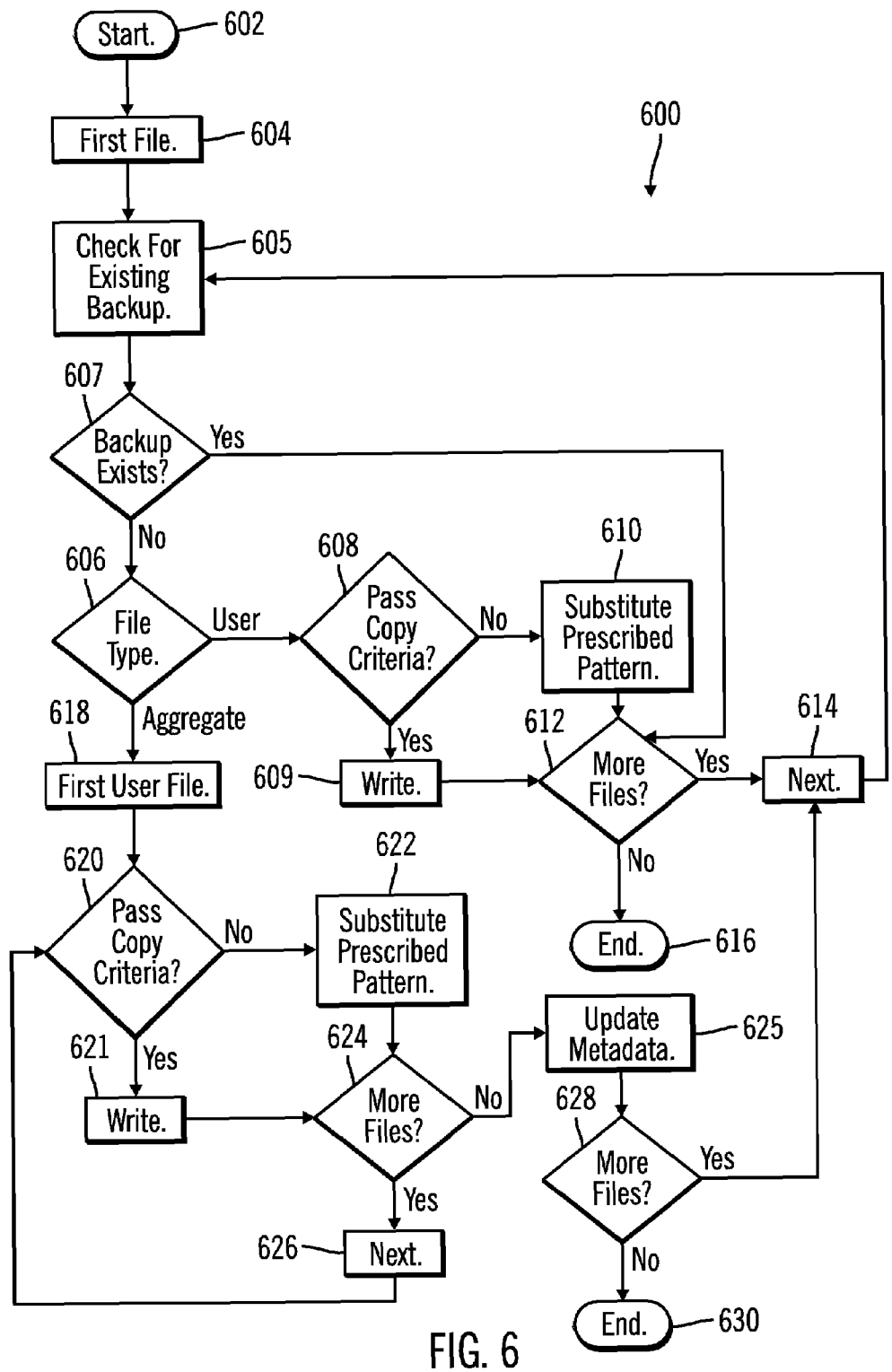
FIG. 6 is a flowchart of an operational sequence for a copy process substituting a predetermined bit pattern for unqualified user files.

FIG. 6 shows a sequence 600 to back up source data to target storage, illustrating one embodiment of the present invention. For ease of explanation, but without any intended limitation, the example of FIG. 6 is described in the context of the system 100 described above.

The routine 600 begins when the storage director 108 receives a BACKUP instruction (step 602). This instruction may be manually sent by a client 106, administrator 104, another process or machine, automatically triggered by predetermined schedule, etc. The BACKUP instruction specifies a body of source data to back up and the target storage to be used. In the illustrated example, the source data comprises a primary storage pool such as 450-452 (FIG. 4B), although different sizes and definitions of source data may be used, such as one or more volumes, physical devices, logical devices, logical surfaces, storage assemblies, extents, ranges, folders, directories, etc.

In step 604, the director 108 begins to process a first managed file of the source data. While this file is being processed, it is referred to as the "current" file. The director 108 may select the first and each subsequent managed file for processing based on any helpful set of criteria, such as size, order, priority, or even arbitrarily. The storage director 108 identifies the constituent managed files of the source data by using the storage table 152 (TABLE 2, above).

In step 605, the storage director checks the storage table 152 to determine whether the current file was previously backed up. If the current file was previously backed up to the target storage, there is no need to repeat another backup for this file, and step 607 advances to step 612 (discussed below). On the other hand, if the current file has not been backed up, step 607 advances to step 606, discussed below.

The director 108 next determines whether the current file is an aggregate file or an individual user file (step 606). This is done by consulting the mapping tables 154, and in particular, concluding that the current file is an aggregate file only if it is shown in TABLE 3A. If the current file is a user file, the director 108 determines whether the current file passes predetermined backup criteria (step 608), also called "qualifying" for backup. In the illustrated example, user files are only backed up if they are "active" as shown by the inventory table 150 (TABLE 1, above). Alternatively, the director 108 may utilize other criteria to determine whether files qualify for backup, which may be available by predetermined list (to minimize overhead) as with active/inactive status, or this determination may be made "on the fly" by examining relevant characteristics of the current file such as size, priority, age, content, owner, etc.

Instead of being written to storage, inactive files are replaced with a prescribed dummy pattern, as explained below. More particularly, step 608 advances to step 609 if the current file passes the backup criteria (i.e., is active), in which case the storage director 108 writes the file to target storage. Otherwise, if the current file fails the backup criteria (i.e., is inactive), the storage director 108 writes a prescribed bit pattern to target storage instead of the current user file (step 610). The length of the bit pattern need not match that of the replaced user file, since individual user files have no offsets to be preserved (unlike aggregate files as discussed below). Upon completion of either step 609 or 610, the storage director 108 inserts an entry into the storage table 152 to show that the current file has been backed up; if step 610 was executed, the "file(s) containing substitute bit pattern" column of this same entry reflects that the bit pattern has been used in substitution for the current user file.

In an exemplary embodiment, the predetermined bit pattern may be prestored in a memory buffer (not shown) of the subsystem 102 in order to expedite repeated copying of the bit pattern to target storage. The bit pattern of step 610 (and step 622, below) is selected to be easily recognized and efficiently compressed by automatic software and/or hardware compression processes that physically write data to the storage hierarchy 114. More particularly, the bit pattern is selected such that, if provided as input to a certain digital data compression process, it would be compressed with at least a particular predicted "compression efficiency". Compression efficiency may be measured for example, as a ratio of pre-compression to post-compression storage size, or another suitable computation. The compression efficiency is "predicted" based upon knowledge of how the implemented compression process treats the predetermined bit pattern; this may be near or even equal the "actual" compression efficiency achieved when compression is subsequently performed. Optimally, the predetermined bit pattern is selected because of its high compressibility, thereby achieving the maximum compression efficiency when compressed. In this respect, certain bit patterns may be chosen because they have an obviously high compressibility by many compression processes, without requiring any specific knowledge of particular compression processes operation. As an example, desirable bit patterns include a sequence of repeating binary zeros, or a sequence of repeating binary ones. Both of these patterns are easily compressed by most known compression processes such as the well known Lempel-Ziv-Welch (LZW) and run length encoding (RLL) techniques. Preferably, the same bit pattern is used each time step 610 (and step 622, below) is invoked, although the bit pattern may be varied between and/or within steps 610, 622 if desired.

In step 612, the storage director 108 asks whether the source data includes any remaining managed files to process. If so, processing of the next managed file begins (step 614), with this file becoming the current file for processing starting in step 605. Otherwise, if step 612 finds that the source data does not contain any other managed files to process, the program 600 ends (step 616).

In contrast to the foregoing description of processing individual user files, a different sequence is used if step 606 finds that the current file is an aggregate file. Namely, step 606 advances to step 618, where the storage director 108 begins by considering a first user file within the subject aggregate file. While this constituent user file is being processed, it is referred to as the "current" user file. The director 108 may select the first and each subsequent constituent user file for processing based on any helpful criteria, such as size, order, priority, or even arbitrarily. The storage director 108 identifies the constituent user files within the current aggregate file by using the mapping tables 154 (namely, TABLE 3A shown above).

The director 108 next determines whether the current user file passes the predetermined backup criteria (step 620), namely, whether the current user file is an "active" file. If the current file passes the backup criteria (i.e., is active), the storage director 108 writes the file to target storage (step 621). Otherwise, if the current file fails the backup criteria (i.e., is inactive), the storage director 108 writes the prescribed bit pattern to target storage instead of the current user file (step 622). In the illustrated example, length of the prescribed, substitute bit pattern (uncompressed) is the same as the length of the current user file (uncompressed) in order to preserve the original offsets of user files within the subject aggregate file.

In step 624, the storage director 108 asks whether the current aggregate file includes any other constituent user files to process. If so, processing of the next user file begins (step 626), with this file becoming the current user file for processing starting in step 620. Otherwise, if step 624 finds that the current aggregate file does not contain any other user files to process, then processing of the current aggregate file is complete. At this point (step 625), the storage director 108 inserts an entry into the storage table 152 to show that the current aggregate file has been backed up, and if appropriate, which user files of that aggregate file contain the predetermined bit pattern.

After step 625, step 628 asks whether the source data contains any more managed files left to process. If so, the next managed file is selected (step 614) and processing of that file begins in step 605. Otherwise, the program 600 ends in step 630.

Sequence for Reclamation

The operations of sequence 600 may be applied to a backup data operation (as discussed above), or to achieve "reclamation" of backup data in order to conserve space. Broadly, reclamation consolidates data storage space by eliminating unwanted or unused space. More specifically, in the context of the illustrated environment, reclamation involves applying the steps 600 to form a further copy of backup data, with any user files that have become inactive since being backed up being replaced with the substitute bit pattern. In reclamation, however, steps 605-607 are omitted because the data inherently exists. Also, in steps 609, 610, 625, metadata is additionally updated to remove references to the original copy.

Sequence for Restore to Primary Storage Pool

Figure 7:
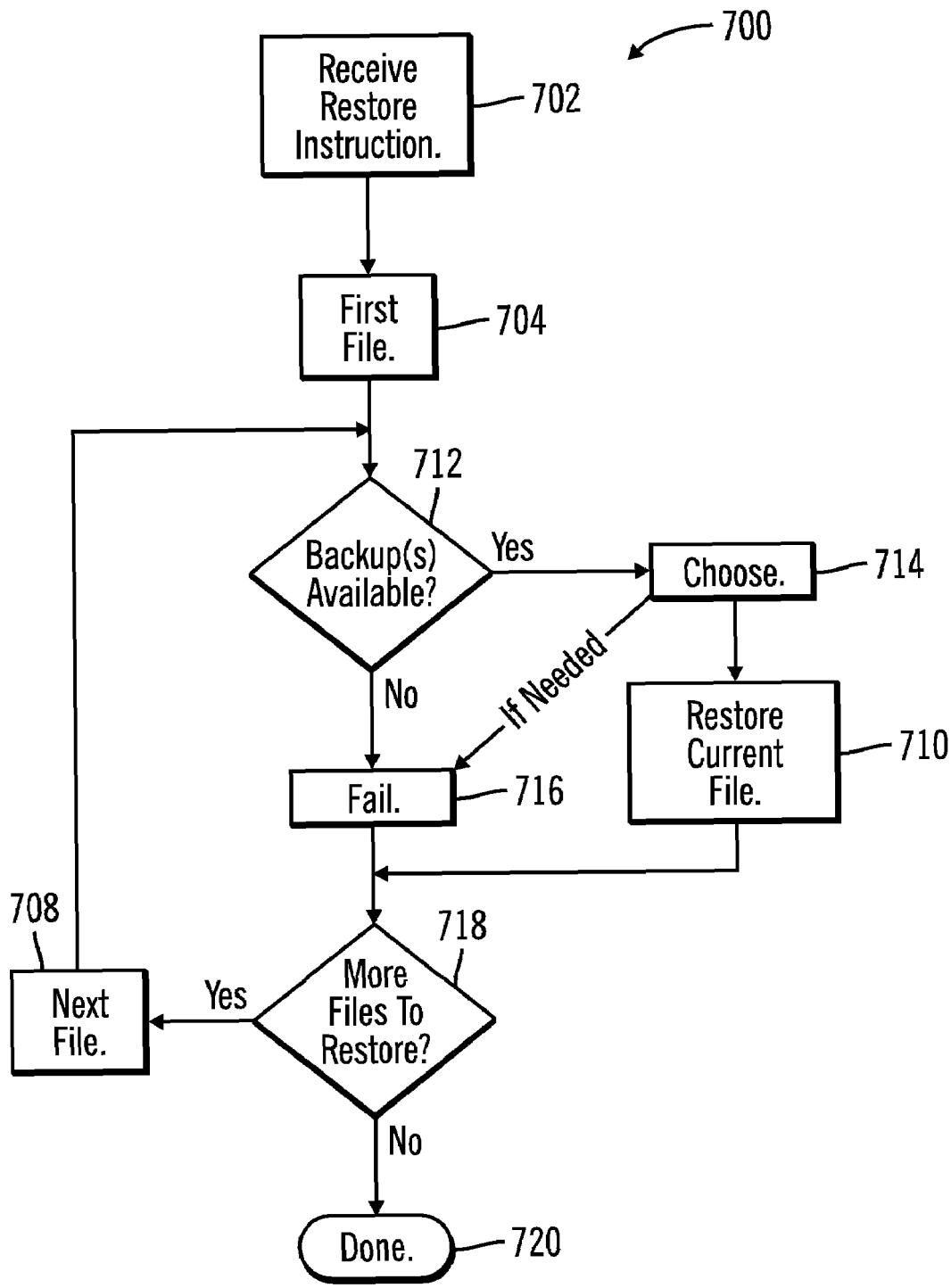
FIG. 7 is a flowchart of an operational sequence for restoring data from one or more copy storage pools due to data of a primary storage pool being lost or inaccessible.

FIG. 7 shows a sequence 700 to restore data from one or more copy storage pools to one or more primary storage pools in the hierarchy 114 due to the data of a primary storage pool being lost or inaccessible. For ease of explanation, but without any intended limitation, the example of FIG. 7 is described in the context of the system 100 described above.

The routine 700 begins when the storage director 108 receives a RESTORE instruction (step 702). As one example, this instruction may be manually instituted by the administrator 104. Alternatively, the instruction may emanate from another process or machine, automatic trigger, predetermined schedule, etc. The RESTORE instruction identifies subject files and a primary storage pool, providing directions to restore these files by copying them from one or more copy storage pools back into the primary storage pool. The RESTORE instruction identifies the subject files by storage location, name, rules, characteristics, wildcard characters, or any other criteria useful in determining which files should be restored.

After step 702, the storage director 108 begins to process the managed files identified in the RESTORE instruction of step 702, one managed file at a time. More particularly, in step 704, the storage director 108 starts with a first managed file of the data to be restored. While this file is being processed, it is referred to as the "current" file. The director 108 may select the first and each subsequent managed file for processing based on any helpful criteria, such as size, order, priority, efficiency, or even arbitrarily.

After step 704, the storage director 108 asks whether the current managed file has been previously backed up, and identifies each different backup if there are more than one (step 712). If the current managed file is a user file, then step 712 involves consulting the storage table 152 (TABLE 2, above) to determine whether this file exists in any copy storage pool, and to identify these copy storage pools (if any). If step 712 finds that there no backups, step 712 advances to step 716, which fails the RESTORE operation for this file and returns a suitable error code or returns a suitable error message to the source of the original RESTORE instruction.

If step 712 finds one or more backup copies of the current file, the director 108 chooses an appropriate backup site from which to carry out the restoration (step 714). The choice of step 714 may be based upon various considerations, such as the following:

1) if backup is on tape, choosing a backup volume that is already mounted to tape accessing equipment.
2) choosing a backup volume that is not being used by another process.
3) if backup is on tape, choosing a backup volume that is in an automated tape library rather than requiring manual mounting or delivery from an off site location.
4) administrator preference.
5) choosing the backup site likely to provide fastest read time based on device performance attributes.
6) if the current file is an aggregate file, choosing a backup site where a minimum number of constituent user files of the aggregate file have been replaced with the substitute bit pattern. This is determined by consulting the storage table 152 to determine which constituent user files of the current (aggregate) file contain valid data and which (if any) contain the substitute bit pattern. In the illustrated embodiment, the "file(s) contain substitute bit pattern" column of the storage table 152 indicates whether each constituent user file contains valid data or not. In a different implementation, where the "file(s) contain substitute bit pattern" column generally indicates whether any constituent user file contains the substitute bit pattern (without identifying which user file), then the storage director additionally consults the mapping tables 154 (namely, TABLE 3A) and the inventory table 150 to determine which constituent user files are "active" and which are "inactive." As for the backed up user files shown to be inactive, these are assumed to be replaced with the substitute bit pattern; backed up user files shown to be active are assumed to represent valid data. For this condition to hold, and in the particular embodiment where the "file(s) contain substitute bit pattern" column does not specifically identify user files containing the substitute bit pattern, the storage director 108 necessarily manages the inventory table 150 so as to prevent inactive files from ever becoming active; to allow flip-flopping would possibly permit restoration of null data. Alternatively, in embodiments where the "file(s) contain substitute bit pattern" column is omitted from the storage table 152, the backup data itself may be examined by comparing at least part of each constituent user file to the substitute bit pattern to determine whether useful data is represented therein.

If all constituent user files of the current aggregate file have been substituted, then this data is not usable for the present RESTORE operation and step 714 jumps to step 716. Here, the storage director 108 takes action to invalidate all user files by removing each user file's data from the inventory table 150, removing references to the aggregate and its constituent user files from the mapping tables and the aggregate attributes table, removing all entries related to this aggregate file from the storage table, and reporting failure of the RESTORE operation for the current file.

7) if the current file is a user file rather than an aggregate file, step 714 chooses a backup site where the user file has not been replaced with the substitute bit pattern. This is done by consulting the "file(s) contain substitute bit pattern" column of the storage table 152. Alternatively, in embodiments where this column is not used, the backup data itself may be examined by comparing at least a part of the data to the substitute bit pattern to determine whether useful data is represented therein. If the current user file has no backups other than those with the substitute bit pattern, then this data is not usable for the present RESTORE operation and step 714 jumps to step 716 to fail the RESTORE operation. In this case, the data is effectively useless and the storage director 108 takes action to invalidate the user file, whereby the storage director 108 removes the user file's data from the inventory table 150, removes storage table entries for the current user file, and reports failure of the RESTORE operation for this user file.

After step 714, the storage director 108 carries out the restore operation from the chosen backup site (step 710). Additionally, step 710 updates the storage table 152 in order to reference the location of the restored file and to delete the reference to the file's original location. Namely, the backup data is copied to the primary storage pool identified in the original RESTORE instruction. After step 710 (or step 716, discussed above), the director 108 asks whether there are more managed files left to restore, according to the original RESTORE instruction (step 718). If so, the director 108 proceeds to the next managed file (step 708), and returns to step 712. Otherwise, if there are no further managed files to restore, step 718 advances to step 720, where the routine 700 ends.

Sequence For Restore to Client Station

Figure 8:
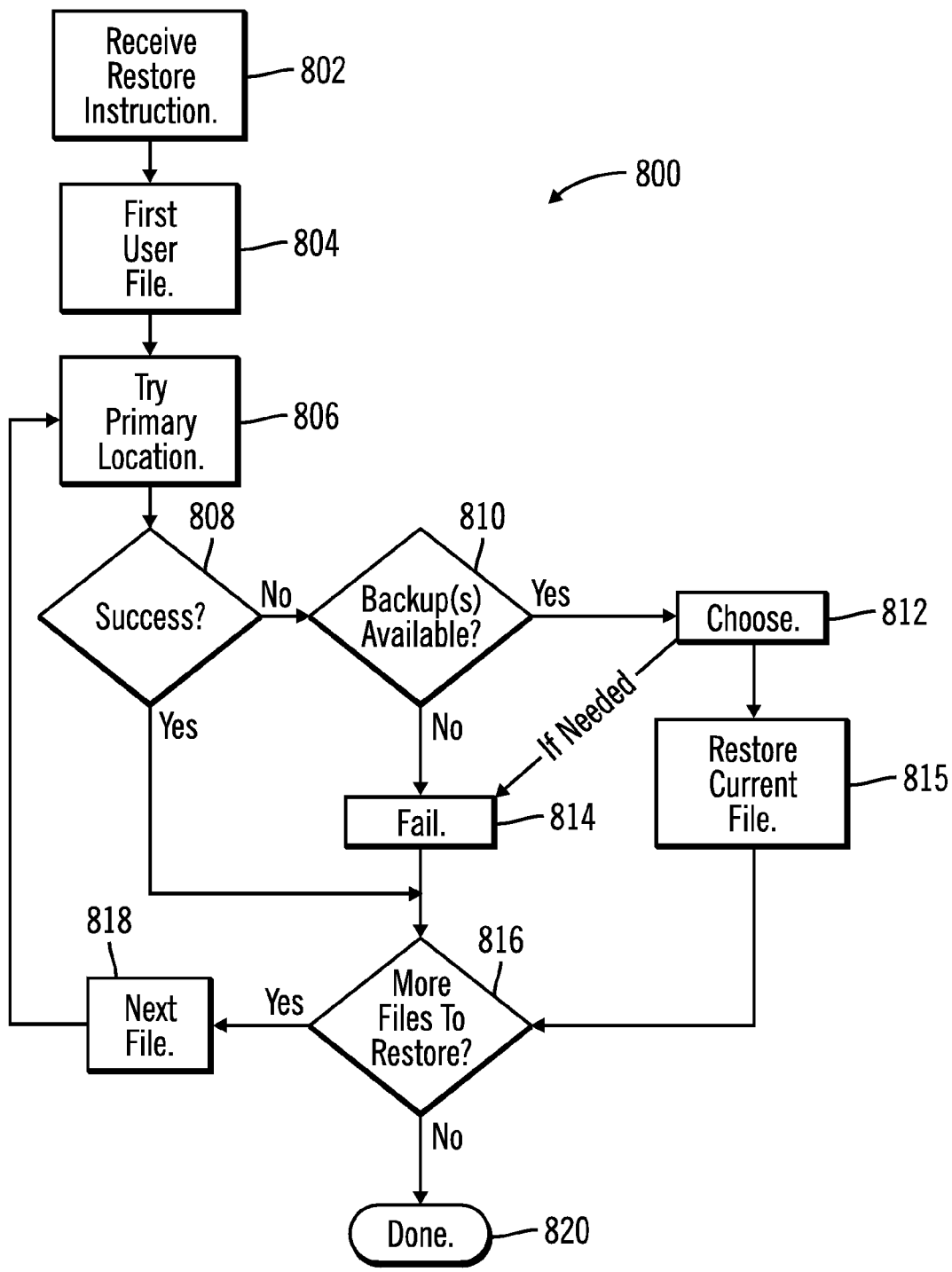
FIG. 8 is a flowchart of an operational sequence for restoring data from the storage hierarchy to a client station due to data becoming lost or inaccessible at that client station.

FIG. 8 shows a sequence 800 to restore data from the storage hierarchy 114 to a client station 106 due to that data becoming lost, deleted, or inaccessible at that client station 106. For ease of explanation, but without any intended limitation, the example of FIG. 8 is described in the context of the system 100 described above.

The routine 800 begins when the storage director 108 receives a RESTORE instruction (step 802). This instruction may be manually or automatically submitted by or on behalf of a client station 106, such as the client station 106 that has experienced the data loss. The RESTORE instruction identifies one or more user files to be restored by sending them from one or more primary or copy storage pools back to the client station 106. The RESTORE instruction identities the subject user files by name, rules, characteristics, wildcard characters, or any other criteria useful in determining which files should be restored.

After step 802, the storage director 108 begins to process a first one of the user files identified in the RESTORE instruction (step 804). While this file is being processed, it is referred to as the "current" file. The director 108 may select the first and subsequent user files for processing based on any helpful criteria, such as size, order, priority, efficiency, or even arbitrarily.

After step 804, the storage director 108 attempts to locate the current user file in its primary storage location (step 806). In the illustrated environment, this step is performed using the mapping tables 154 (namely, TABLE 3B, above) and the storage table 152 (TABLE 2, above). If the current user file was found, the storage director 108 reads the current user file from the primary location and copies it to the client station 108 (also in step 806). After step 806, step 808 asks whether the operation of step 806 succeeded. If so, step 808 advances to step 816, described below.

On the other hand, if the current user file cannot be found at the primary location, step 808 advances to step 810, which asks whether the current user file had been previously backed up from the primary location, and identifies each different backup if there are more than one. This is performed by consulting the storage table 152 (TABLE 2, above) to determine whether this file exists in any copy storage pool, and to identify these copy storage pools (if any). If step 810 finds that there no backups, step 810 advances to step 814, which fails the RESTORE operation for this user file and returns a suitable error code or returns a suitable error message to the source of the original RESTORE instruction.

If the current user file has been previously backed up, the director 108 chooses an appropriate backup site (step 812). If there are multiple backup sites, the choice among backup sites may be made using similar considerations, as discussed above in conjunction with FIG. 7. If there are one or more backups available, but the current user file has been replaced by the substitute bit pattern in each backup site, then step 812 jumps to step 814 where the storage director fails the RESTORE operation. In this case, the storage director 108 may optionally invalidate the file in the manner discussed above. After step 814, control passes to step 816 to determine whether there are more files left to restore. If step 812 completes successfully, however, the storage director 108 proceeds to step 815, where it carries out the restore operation from the chosen backup site.

After step 815 (or step 814 or an affirmative answer to step 808), step 816 checks whether there are more user files left to restore, according to the original RESTORE instruction of step 802. If so, the director 108 proceeds selects the next user file in step 818, and returns to step 806. Otherwise, if there are no further user files to restore, step 816 advances to step 820, where the routine 800 ends.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of backing up files to storage, comprising operations of:
    determining whether a file is active, wherein an active file qualifies to be backed up to storage;
    if said determining operation determines said file is active, writing said file to storage; and
    if said determining operation determines said file is inactive, wherein an inactive file does not qualify to be backed up to storage, writing a prescribed bit pattern to storage, said prescribed bit pattern unrelated to data of said file, and wherein said prescribed bit pattern replaces said inactive file.

2. The method of claim 1, additionally comprising the operation of indicating said replaced file exists in said storage.

3. The method of claim 1,
    wherein said prescribed bit pattern comprises a pattern having at least a particular predicted compression efficiency.

4. The method of claim 3,
    wherein said prescribed bit pattern comprises a pattern having a sequence of repeating binary zeros.

5. The method of claim 3,
    wherein said prescribed bit pattern comprises a pattern having a sequence of repeating binary ones.

6. A machine readable medium tangibly embodying a program of machine-readable instructions executed by a digital processing apparatus to perform operations to back up files to storage, comprising:
    determining whether a file is active, wherein an active file qualifies to be backed up to storage;
    if said determining operation determines said file is active, writing said file to storage; and
    if said determining operation determines said file is inactive, wherein an inactive file does not qualify to be backed up to storage, writing a prescribed bit pattern to storage, said prescribed bit pattern unrelated to data of said file, and wherein said prescribed bit pattern replaces said inactive file.

7. The medium of claim 6, additionally comprising the operation of indicating said replaced file exists in said storage.

8. The medium of claim 6,
    wherein said prescribed bit pattern comprises a pattern having at least a particular predicted compression efficiency.

9. The medium of claim 8,
    wherein said prescribed bit pattern comprises a pattern having a sequence of repeating binary zeros.

10. The medium of claim 8,
    wherein said prescribed bit pattern comprises a pattern having a sequence of repeating binary ones.

11. A data storage system, comprising:
    digital data storage for storing files;
    a storage director, programmed to perform data storage operations for backing up files to said digital data storage, comprising:
        determining whether a file is active, wherein an active file qualifies to be backed up to digital data storage;
        if said determining operation determines said file is active, writing said file to said digital data storage; and
        if said determining operation determines said file is inactive, wherein an inactive file does not qualify to be backed up to digital data storage, writing a prescribed bit pattern to said digital data storage, said prescribed bit pattern unrelated to data of said file, and wherein said prescribed bit pattern replaces said inactive file.

12. The data storage system of claim 11, additionally comprising the operation of indicating said replaced file exists in said storage.

13. The data storage system of claim 11,
    wherein said prescribed bit pattern comprises a pattern having at least a particular predicted compression efficiency.

14. The data storage system of claim 13,
    wherein said prescribed bit pattern comprises a pattern having a sequence of repeating binary zeros.

15. The data storage system of claim 14,
    wherein said prescribed bit pattern comprises a pattern having a sequence of repeating binary ones.

16. Logic circuitry comprising hardware having multiple interconnected electrically configured conductive elements configured to perform operations to back up files to storage, comprising:
    determining whether a file is active, wherein an active file qualifies to be backed up to storage;
    if said determining operation determines said file is active, writing said file to storage;
    if said determining operation determines said file is inactive, wherein an inactive file does not qualify to be backed up to storage, writing a prescribed bit pattern to storage, said prescribed bit pattern unrelated to data of said file, and wherein said prescribed bit pattern replaces said inactive file.

17. The logic circuitry of claim 16, additionally comprising the operation of indicating said replaced file exists in said storage.

18. The logic circuitry of claim 16,
    wherein said prescribed bit pattern comprises a pattern having at least a particular predicted compression efficiency.

19. The logic circuitry of claim 18,
    wherein said prescribed bit pattern comprises a pattern having a sequence of repeating binary zeros.

20. The logic circuitry of claim 18,
    wherein said prescribed bit pattern comprises a pattern having a sequence of repeating binary ones.

* * * * *